(12) United States Patent
Kim

(10) Patent No.: US 8,348,175 B2
(45) Date of Patent: Jan. 8, 2013

(54) APPARATUS FOR PREVENTING AND REMOVING FOG AT RUNWAY USING SPRINKLERS

(76) Inventor: Choon San Kim, Incheon (KR)

(*) Notice: Subject to any disclaimer, the term of this patent is extended or adjusted under 35 U.S.C. 154(b) by 193 days.

(21) Appl. No.: 12/681,889

(22) PCT Filed: Mar. 19, 2010

(86) PCT No.: PCT/KR2010/001719
§ 371 (c)(1),
(2), (4) Date: Apr. 6, 2010

(87) PCT Pub. No.: WO2011/052857
PCT Pub. Date: May 5, 2011

(65) Prior Publication Data
US 2011/0253799 A1    Oct. 20, 2011

(30) Foreign Application Priority Data

Oct. 29, 2009  (KR) .................. 10-2009-0103610
Mar. 2, 2010   (KR) .................. 10-2010-0018526

(51) Int. Cl.
*A01G 15/00* (2006.01)
(52) U.S. Cl. ....... 239/14.1; 239/128; 239/134; 239/135; 239/207; 239/332; 222/146.1

(58) Field of Classification Search ............ 239/2.1, 239/14.1, 128, 132, 133, 134, 135, 332, 207; 222/146.1
See application file for complete search history.

(56) References Cited

U.S. PATENT DOCUMENTS
5,368,787 A * 11/1994 Yonamoto et al. ........... 261/36.1

* cited by examiner

*Primary Examiner* — Christopher Kim
(74) *Attorney, Agent, or Firm* — Christopher Paul Mitchell

(57) ABSTRACT

There is provided an apparatus for preventing and removing fog at an airport runway. The apparatus includes: a water tank 10 buried in a ground around a runway; a water tank temperature sensor 20 for sensing a water temperature in the water tank; a heater 30 provided inside the water tank, for heating water contained in the water tank; a cooling device 40 provided inside the water tank, for cooling water contained in the water tank; the sprinklers 50 installed at opposite sides along the runway and over the ground around the runway, and supplied with the water from the water tank to spray water towards the atmosphere over and around the runway; and a controller 60 controlling, on the basis of the water temperature of the water tank measured using the temperature sensor, operation of the sprinklers, the heater, and the cooling device, according to an externally inputted operational signal.

8 Claims, 4 Drawing Sheets

[Fig. 1]
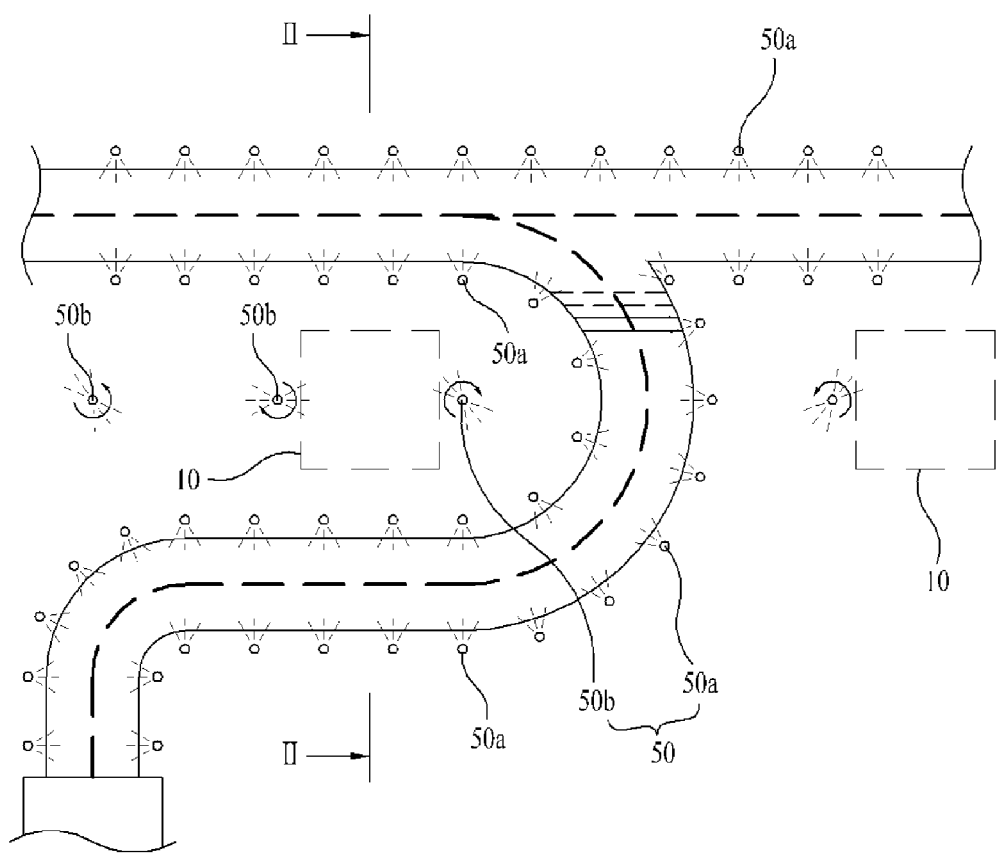

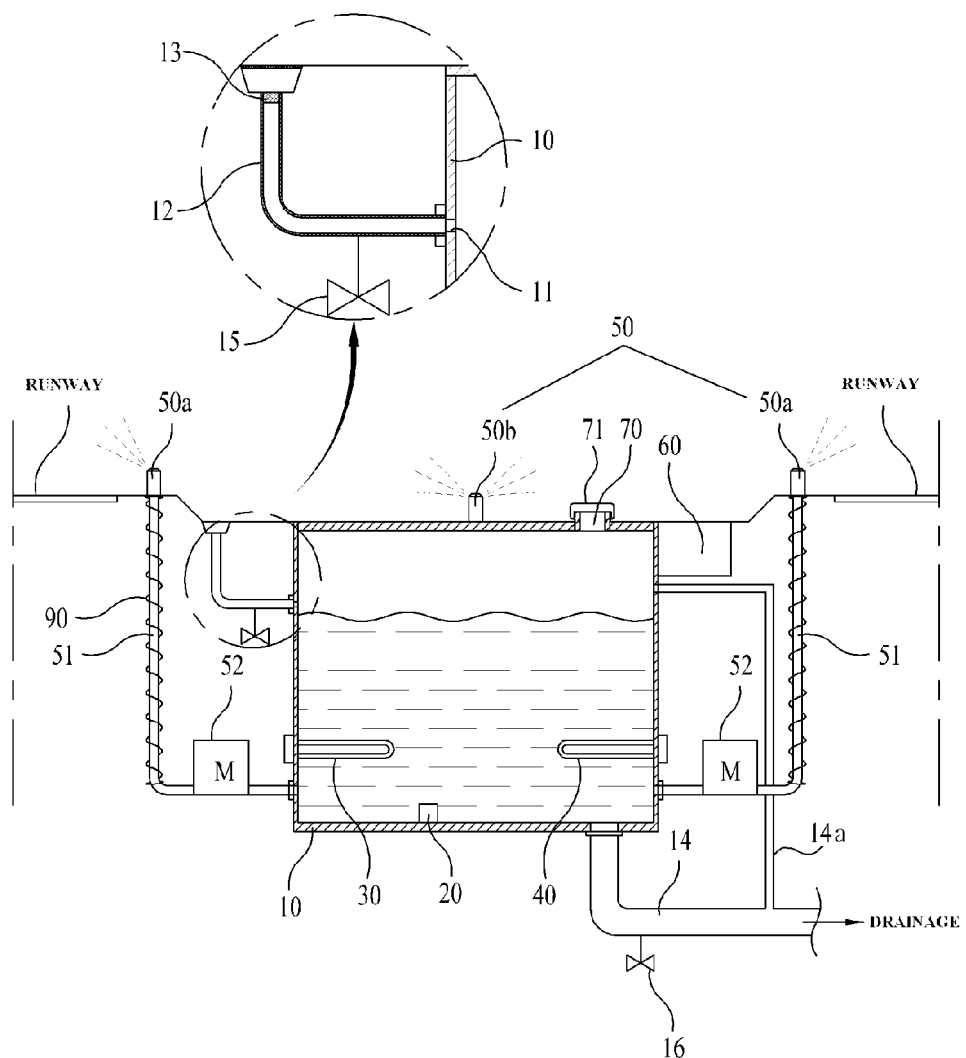
[Fig. 2]

[Fig. 3]
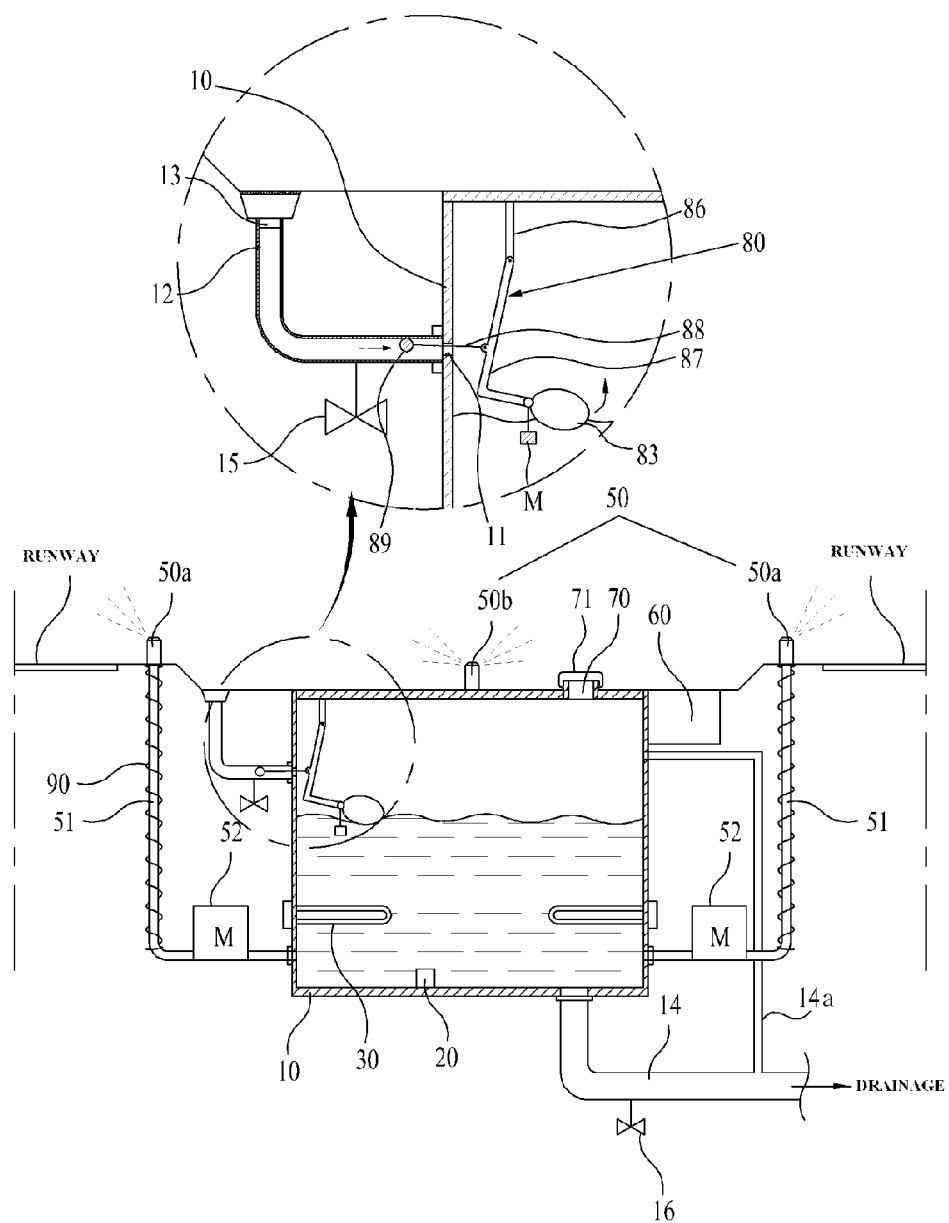

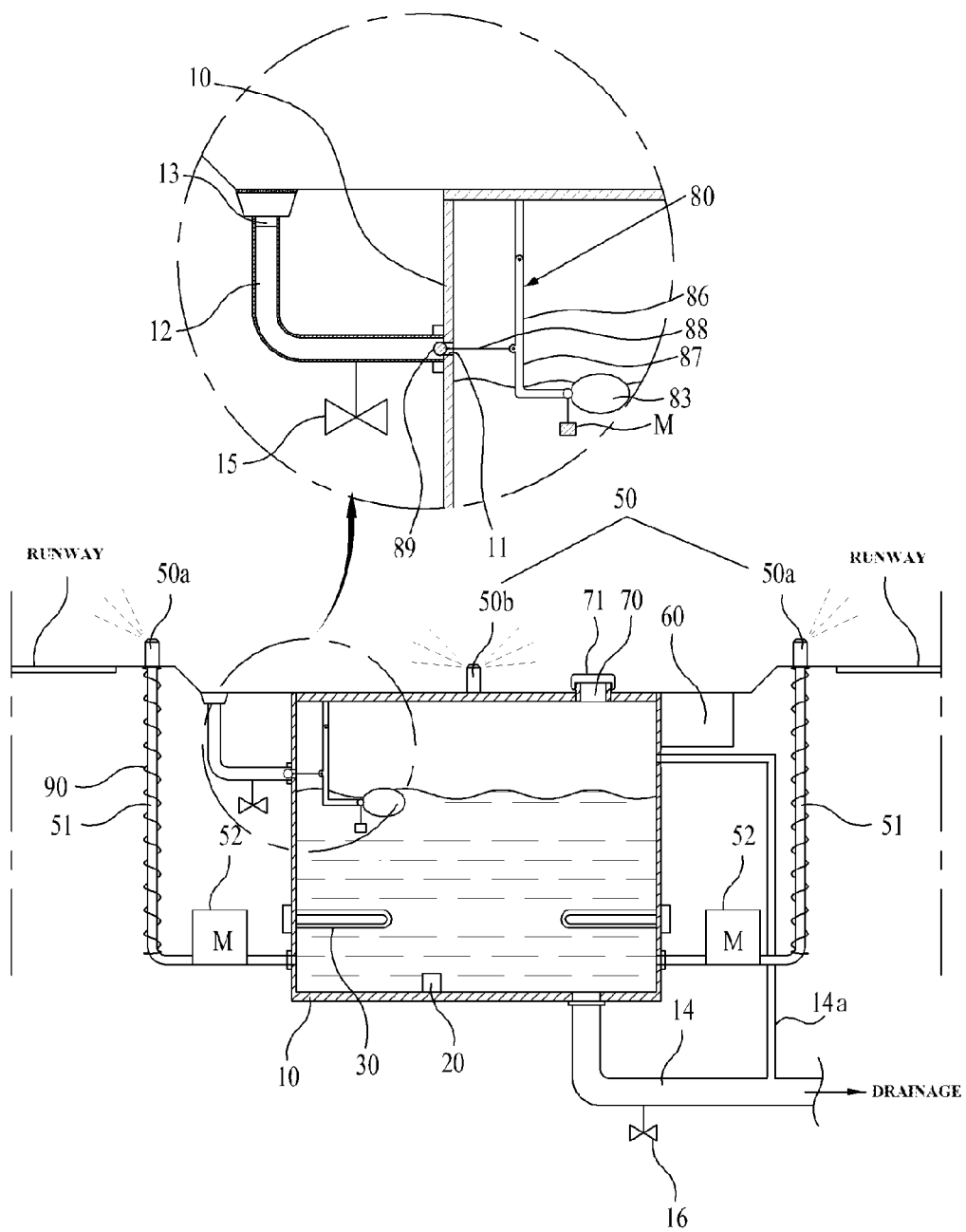
[Fig. 4]

APPARATUS FOR PREVENTING AND REMOVING FOG AT RUNWAY USING SPRINKLERS

RELATED APPLICATIONS

This application is a 371 application of International Application No. PCT/KR2010/001719, filed Mar. 19, 2010, which in turn claims priority from Korean Patent Application Nos. 10-2010-0018526, filed Mar. 2, 2010, and 10-2009-0103610, filed Oct. 29, 2009, all of which are incorporated herein by reference in their entireties.

TECHNICAL FIELD

The present invention relates to an apparatus for preventing and removing fog at an airport runway, and more specifically, to an apparatus for preventing and removing fog at a runway using sprinklers, in which the sprinklers are installed around the airport runway, and upon the occurrence of fog or an anticipation thereof, water is discharged to prevent the occurrence of fog or to rapidly remove the fog having occurred, around the runway, taxiway, or GSE (service road).

BACKGROUND ART

Generally, the occurrence of fog at the airport may frequently cause the cancellation of the aircraft flights. It causes delayed departure of passengers and air cargo transports, leading to inefficiency of the work. Further, it causes delayed arrival of aircraft, thus leading to vast economic loss, such as aircraft fuel consumption due to a circular flight over the airport. Also, the aircrafts may be exposed to danger due to poor visibility. Thus, the occurrence of fog at the airport causes the above and other various problems.

To solve the above mentioned problems, there have recently been proposed apparatuses or methods for preventing the frequent occurrence of fog at a runway and for removing the fog having occurred. The examples can be found in Korean patent application No. 10-2001-0041660, entitled "System for removing fog" and Korean utility model application No. 20-2001-0014033, entitled "Apparatus for preventing and removing fog at a runway using compressed air".

The former invention removes fog by evaporating nitrogen and oxygen liquids over a fog area to separate moisture contained in the fog, and simultaneously, by spraying dried and hot nitrogen and oxygen gases through nozzles towards the fog area to remove the above moisture. The latter invention has an air compression chamber around a runway, from which compressed air is sprayed through a vertical discharging pipe installed around the runway, which causes a turbulent flow used to remove the fog.

PRIOR ARTS

Patent Documents

Korean Patent Publication No. 10-2003-0006097 (2003.01.23)
Korean Utility Model Registration No. 20-0243412 (2001.10.15)

DISCLOSURE

Technical Problem

The prior arts as mentioned above could provide several effects, but do not provide practical alternatives due to their inefficiency and high costs in terms of the energy savings, since high-temperature gas or compressed air should be discharged toward atmosphere so as to remove the fog occurring at broad regions.

An object of the present invention is to solve the above mentioned problems, and to provide an apparatus for preventing and removing fog at a runway using sprinklers, which can efficiently remove the fog occurring at broad regions in a cost-effective and energy-saving manner.

Technical Solution

The above objects can be accomplished by an apparatus for preventing and removing fog at a runway using sprinklers, the apparatus including: a water tank which is buried in a ground around a runway; a water tank temperature sensor which is configured to sense a water temperature in the water tank; a heater which is provided inside the water tank to heat water contained in the water tank; a cooling device which is provided inside the water tank to cool the water contained in the water tank; the sprinklers which is installed at opposite sides along the runway and over the ground around the runway and which is supplied with the water from the water tank to spray the water towards the atmosphere over and around the runway; and a controller which controls, on the basis of the water temperature in the water tank measured using the temperature sensor, operations of the sprinklers, the heater, and the cooling device, according to an externally inputted operational signal.

Advantageous Effects

The present invention configured as disclosed above provides advantages that fog occurring at broad regions can be very efficiently removed in a cost-effective and energy-saving manner, since water contained in the water tank buried in the ground is sprayed to remove fog.

DESCRIPTION OF DRAWINGS

FIG. 1 shows a state where an apparatus for preventing and removing fog at a runway using sprinklers is being used.

FIG. 2 shows a cross-sectional view taken along line II-II in FIG. 1.

FIG. 3 shows a cross-sectional view taken along line II-II in FIG. 1, in which an automatic water level adjusting member is further provided.

FIG. 4 shows a state where the water level in the water tank is automatically adjusted using the automatic water level adjusting member as the water level in the water tank is raised.

MODE FOR INVENTION

The features and advantages of the present invention will become apparent from the following description of exemplary embodiments of the present invention. The terms or words used in the description and claims should be construed as meanings and concepts corresponding to the technical idea of the present invention, based upon the principle that the inventors are able to properly define the concepts of the terms in order to explain his or her own invention in the best manner.

As shown FIGS. 1 and 2, an apparatus for preventing and removing fog at a runway using sprinklers according to an exemplary embodiment of the present invention, includes a water tank 10 buried in a ground around a runway; a water tank temperature sensor 20 for sensing a water temperature in the water tank 10; a heater 30 provided inside the water tank 10, for heating water contained in the water tank 10; a cooling device 40 provided inside the water tank 10, for cooling water contained in the water tank 10; sprinklers 50 installed at opposite sides along the runway and over the ground around the runway, and supplied with the water from the water tank 10 to spray the water towards the atmosphere over and around the runway; and a controller 60 controlling, on the basis of the water temperature of the water tank 10 measured using the temperature sensor 20, operations of the sprinklers 50, the heater 30, and the cooling device 40, according to an externally inputted operational signal.

The present invention is based on the fact that fog, referred to as radiation fog, occurs when air near the ground becomes cooled below the dew point due to the radiation cooling, and fog, referred to as advection fog, occurs when hot and moist air passes over a cool ground surface. Based on the forecast temperature announced in real time, available from aviation weather forecast, and on information about the dew point, the atmosphere temperature around the runway is intentionally raised so as not to fall below the dew point, or is intentionally lowered so as not to be under the influence of the hot and moist air which advects over or around the runway.

The water tank 10 is buried in the ground around the runway such that it does not serve as a dangerous element during take-off or landing of aircrafts and water is easily introduced. In particular, in consideration of a vast green field around the runway, it is preferable but not necessary that the water tank 10 is buried in the green field.

The water tank 10 is provided with a water inlet 11 through which water is fed from the outside. The water inlet 11 is connected to a separate water supply pipe 12 which is connected to a water collection passage installed around the runway, so that rain water or raindrops as well as underground water or tap water, flowing along the water collection passage, can be fed into the water tank 10.

At an end part of the water collection passage may be provided a filter 13 used to filter out foreign matters which may be contained in water from the water tank 10. Such an installation provides easier exchange of the filter 13 and the filtering out of the foreign matters contained in water flowing into the water collection passage.

A bottom of the water tank 10 may be provided with a first water outlet pipe 14 which is connected to a drainage installed around the runway. In this case, water from the water tank 10 fully filled with water or sewage and wastewater occurring at the time of cleaning the water tank 10 can be discharged to the drainage through the first water outlet pipe 14.

The water tank 10 may be, although not shown, enclosed by a cover made of thermal insulation materials, which allows water temperature of the water tank 10 not to be raised or lowered due to the thermal conduction to the outside. It is noted that said water temperature may be adjusted through the use of the heater 30 or the cooling device 40.

The temperature sensor 20 may be attached inside the water tank 10 in order to sense the temperature of the water contained in the water tank 10. Further, inside the water tank 10 may be installed the heater 30 for heating the water contained in the water tank 10, and the cooling device 40 for cooling the water contained in the water tank 10. The heater 30 and the cooling device 40 are supplied with external electric power to be operated.

The plurality of sprinklers 50 may be installed at opposite sides along the runway and over the ground around the runway. The sprinklers 50 receive the water from the water tank 10 and operate to spray the water towards the atmosphere over and around the runway. To this end, each of the sprinklers 50 may have a sprinkler pipe 51 connected to the water tank 10 and a motor pump 52 connected to the sprinkler pipe 51.

The controller 60 is provided adjacent to the water tank 10. The controller 60 receives information about the water temperature of the water tank 10 measured using the temperature sensor 20 and receives an operational signal given by a control tower or other management offices in a wireless or wired manner, to control the operations of the sprinklers 50, the heater 30, and the cooling device 40. The controller 60 may be buried in the ground together with the water tank 10, or may be installed over the ground for external manipulations and for smooth remote two-way communications.

In the case where the controller 60 is installed, although not shown, over the ground, it enables an operator be capable of manually controlling the operations of the heater 30 and the cooling device 40, in which case the controller 60 may further have a temperature adjusting device for setting the temperature of the water contained in the water tank 10, and a temperature indication device connected to the temperature sensor 20.

The above temperature adjusting device is connected to both the heater 30 and the cooling device 40 to selectively operate, based on the temperature set, the heater 30 and the cooling device 40. In this way, the operator may recognize the current water temperature known by the temperature indication device and then set an appropriate temperature using the temperature adjusting device, to thereby control the temperature of the water contained in the water tank 10 at the set temperature.

The operational signal inputted to the controller 60 may include a target temperature control signal and an operation stop signal.

In the case where the received operational signal is the target temperature control signal, the controller 60 controls the operation of the heater 30 or the cooling device 40 so that the water temperature in the water tank 10 reaches the target temperature. If the water temperature in the water tank 10 reaches the target temperature, the controller 60 operates the sprinkler 50. Also, in the case where the received operational signal is the operation stop signal, the controller 60 stops the operations of the sprinkler 50 and the heater 30 or the cooling device 40 at the same time.

On an upper side of the water tank 10, there is provided an inlet 70 enabling functional materials from the outside, such as antifreeze or calcium chloride, to be put inside the water tank 10. The inlet 70 may be selectively opened or closed by a cover 71. In this case, if antifreeze or calcium chloride is put into the water tank through the inlet 70 during winters, the water contained in the water tank 10 is not readily frozen, and the water sprayed through the sprinklers 50 is also not readily frozen.

Reference numeral 15 denotes a valve which operates to close the water supply pipe 12 when water is filled with the water tank 10 beyond a certain water level, in which the operation of the valve is controlled by the controller 60 or from the outside. Reference numeral 14a denotes a second water outlet pipe installed on an upper side of the water tank 10 and connected to the first water outlet pipe 14 or the drainage. The second water outlet pipe 14a is employed so that excess water contained in the water tank 10 beyond a certain water level can be automatically discharged through the drainage.

As shown in FIGS. 3 and 4, inside the water tank 10 may be further provided an automatic water level adjusting member 80 for automatically adjusting water level of the water tank 10 by opening or closing the water inlet 11, depending upon change in the water level of the water tank 10. The automatic water level adjusting member 80 may include: a support 86 installed on an upper side of the water tank 10; an L-type pivot support 87 pivotably suspended to the support 86; a float 83 coupled to an end part of the pivot support 87 and for giving a pivot force to the pivot support 87 by varying elevational heights, depending on the change in the water level; a traction bar 88 pivotably coupled to one side of the pivot support 87; a ball 89 coupled to the traction bar 88 and positioned inside the water supply pipe 12, for being pulled toward the water inlet 11 by the traction bar 88 in order to close the water inlet 11 as the float 83 ascends.

A weight M may be coupled to the float 83. The weight M produces pressure such that when the float 83 is lowered to allow the traction bar 88 to be moved through the water inlet 11, the ball 89 having blocked the water inlet 11 can be strongly pushed in a direction being distanced from the water inlet 11. Due to water pressure created by the water flowed into the water inlet 11 through the water supply pipe 12, the movement of the ball 89 towards the water inlet 11 may occur again, but the weight M inhibits such a movement. Therefore, it ensures that the water inlet 11 opens when the water level of the water tank 10 is below a specific water level.

The ball 89 may have its surface to which a watertight rubber member (not shown) contacting with the water inlet 11 is further attached so as to prevent the water from flowing into the inside of the water tank 10 through the water inlet 11 when the water inlet 11 is closed.

In the automatic water level adjusting member 80 configured as described above, the following operations will be made under the state as shown in FIG. 4. That is, as the water level in the water tank 10 is raised due to the inflow of water into the water tank 10 through the water inlet 11, the pivot support 87 pivots counterclockwise about a lower end of the support 86, which causes the traction bar 88 to pull the ball 89 towards the water inlet 11. When the predetermined water level is reached, the float 83 is fully raised, which then produces the sealing of the water inlet 11 by the ball 89. Thus, the water level in the water tank 10 is no longer raised, and the inflow of the water into the water tank 10 is blocked until the water level in the water tank 10 is lowered again.

The present embodiment may be modified to be provided with at least the one of the automatic water level adjusting member 80, the valve 15 and the second water outlet pipe 14*a*.

Reference numeral 16 denotes a valve installed at the first water outlet pipe 14 and controlled externally or by the controller 60 for a manual discharge of the water contained in the water tank 10, such as during a cleaning of the water tank 10. Considering that the water supply pipe 12 and the first water outlet pipe 14 are buried in the ground, electronic valves may be appropriate as the valves 15 and 16.

In addition, the sprinkler pipe 51 may be wound by a hot wire 90 around it so as to keep the sprinkler pipe 51 from freezing and bursting during winters. The hot wire 90 is operated by an external power supply, and contains therein a temperature sensor (not shown) connected to the controller. The controller receives information about temperature of the sprinkler pipe 51 from the temperature sensor. If the controller determines that the temperature of the sprinkler 51 falls below a predetermined temperature, the controller performs control so that electric power is supplied to the hot wires 90 until the sprinkler pipe 51 reaches the predetermined temperature. Although not shown, the hot wire 90 is preferably but not necessarily installed at all of pipes of a freezing burst possibility, including the first water outlet pipe 14, the second water outlet pipe 14*a* and the water supply pipe 12, as well as the sprinkler pipe 51.

In the apparatus for preventing and removing fog at the runway using the sprinklers 50 according to the present embodiment, a control tower or other management offices sends an operational signal to the controller 60 in a wired or wireless manner, when fog occurs around the runway or when it is anticipated.

The operational signal serves as a target temperature control signal. The control tower or other management offices checks the weather forecast available from the weather station and then sets a target temperature of the water to be sprayed towards the atmosphere so as to remove the fog. In case of radiation fog, the target temperature may be set to a temperature higher than the forecast temperature by 5° C. or more. Also, in case of advection fog, the target temperature may be set to a temperature lower than the forecast temperature by 5° C. or more.

The controller 60 operates the heater 30 or the cooling device 40 until the water temperature in the water tank 10 reaches the received target temperature. If the controller 60 determines that the water temperature in the water tank 10 reaches the target temperature, then the controller 60 operates the sprinklers 50.

The sprinklers 50*a* installed at opposite sides along the runway are supplied with the water contained in the water tank 10 and then spray the water over the runway to forcibly raise or lower the temperature of the runway, to thereby prevent in advance the occurrence of fog or prevent additional occurrence of fog. Also, the water sprayed by the sprinklers 50 may combine with water molecules contained in fog and then fall to the ground, thereby removing fog having occurred at the runway. That is, in case of advection fog or when the occurrence of such fog is anticipated, the controller 60 operates the cooling device 40 in such a manner that the water of lower temperature than that of atmosphere is sprayed through the sprinklers 50, while in case of radiation fog or when the occurrence of such fog is anticipated, the controller 60 operates the heater 30 in such a manner that the water of higher temperature than that of atmosphere is sprayed through the sprinklers 50.

Similar to the sprinklers 50*a* installed at opposite sides along the runway, the sprinklers 50*b* installed over the green field around the runway are supplied with the water contained in the water tank 10 and then spray the water towards the green field around the runway to forcibly raise or lower the temperature at the green field around the runway, to thereby prevent in advance the occurrence of fog or prevent the spread of fog already having occurred. Also, the water sprayed by the sprinkler 50 may combine with water molecules contained in fog and then fall to the ground, thereby removing fog having occurred at the green field around the runway. In this respect, omni-directional rotatable sprinklers may be employed as the sprinklers 50*b* installed over the green field around the runway, so that the water can be evenly sprayed over broader regions.

When fog has been removed through the use of the sprinklers 50, the control tower or other management offices sends the operation stop signal to the controller 60. The controller 60 receives the operation stop signal, and stops the operations of the sprinklers 50 and the heater 30 or the cooling device 40 simultaneously, in response to the received operation stop signal.

In addition, the water sprayed through the sprinklers 50 is collected in the water collection passage around the runway and then recovered along the water supply pipe 12 through the water inlet 11 of the water tank 10 and then into the water tank 10. At this time, the recovered water is recovered with the removal of foreign matters contained therein using the filter 13 installed at the water supply pipe 12. The operator may periodically exchange the filter 13 and remove the collected foreign matters. Accordingly, since the water sprayed through the sprinklers 50 falls to the ground and flows into the water tank 10 along the water collection passage, the extra work for feeding water by the operator is not required, and yet the constant water level in the water tank 10 is kept.

If excess water is flowed into the water tank 10 beyond the constant water level, the water level in the water tank 10 is automatically adjusted using the automatic water level adjusting member 80 or through the second water outlet pipe 14a. The water level in the water tank 10 may be manually adjusted using the valves 15 and 16, if necessary.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

| <Reference numerals> | | |
| --- | --- | --- |
| | 10 | Water tank |
| | 11 | water inlet |
| | 12 | water supply pipe |
| | 13 | filter |
| | 14 | first water outlet pipe |
| | 14a | second water outlet pipe |
| | 15, 16 | valve |
| | 20 | water tank temperature sensor |
| | 30 | heater |
| | 40 | cooling device |
| | 50 | sprinkler |
| | 60 | controller |
| | 70 | inlet |
| | 71 | cover |
| | 80 | automatic water level adjusting member |
| | 86 | support |
| | 87 | pivot support |
| | 88 | traction bar |
| | 89 | ball |
| | 90 | hot wire |

The invention claimed is:

1. An apparatus for preventing and removing fog, the apparatus comprising:
   a water tank configured to be buried in a ground adjacent to a runway;
   a water tank temperature sensor configured to sense a water temperature of water in the water tank;
   a heater which is provided inside the water tank and configured to heat the water contained in the water tank;
   a cooling device which is provided inside the water tank and configured to cool the water contained in the water tank;
   sprinklers configured to be installed at opposite sides along the runaway and over the ground adjacent to the runaway and to spray the water supplied from the water tank towards the atmosphere over and adjacent to the runaway;
   a controller configured to control operation of the sprinklers, the heater, and the cooling device on the basis of the water temperature of the water in the water tank measured by the water temperature sensor, according to an externally inputted operational signal; and
   an automatic water level adjusting member which is installed inside the water tank to automatically adjust water level of the water tank by opening or closing a water inlet, depending upon change in the water level of the water tank, wherein the automatic water level adjusting member comprises:
      a support which is installed on the upper side of the water tank;
      an L-type pivot support which is pivotably suspended to the support;
      a float which is coupled to an end part of the pivot support to give a pivot force to the pivot support by varying an elevational height depending on the change in the water level;
      a weight which is suspended to the float;
      a traction bar which is coupled to one side of the pivot support;
      a ball which is coupled to the traction bar and positioned inside a water supply pipe to be pulled toward the water inlet by the traction bar in order to close the water inlet as the float ascends.

2. The apparatus according to claim 1, wherein the water tank is provided with a water inlet configured to be connected to a water collection passage installed adjacent to the runway to receive water from the water collection passage.

3. The apparatus according to claim 2, wherein a filter used to filter out foreign matters is installed at an end part of a water supply pipe, which is configured to be located on a side of the water collection passage and in which the water collection passage and the water inlet are connected to each other.

4. The apparatus according to claim 1, wherein a first water outlet pipe configured to be connected to a drainage installed adjacent to the runaway is connected to a bottom of the water tank.

5. The apparatus according to claim 1, wherein the externally inputted operational signal comprises one or more of a target temperature control signal and an operation stop signal.

6. The apparatus according to claim 5, wherein in a case where the externally inputted operational signal is the target temperature control signal, the controller controls the operation of the heater or the cooling device until the water temperature in the water tank reaches a target temperature, and if the water temperature in the water tank reaches the target temperature, the controller operates the sprinklers, and wherein in a case where the operational signal is the operation stop signal, the controller stops the operation of the sprinklers and the heater or the cooling device simultaneously.

7. The apparatus according to claim 1, wherein the water tank is provided with an inlet through which functional materials from the outside are able to be put inside the water tank, the apparatus further comprising a cover which selectively opens or closes the inlet.

8. The apparatus according to claim 1, wherein each sprinkler is provided with a sprinkler pipe, and the sprinkler is wound by a hot wire to keep the sprinkler pipe from freezing and bursting.

* * * * *